United States Patent [19]
Glover et al.

[11] Patent Number: 5,108,527
[45] Date of Patent: Apr. 28, 1992

[54] METHOD OF MANUFACTURE OF A TIRE

[75] Inventors: Christopher J. Glover, Buckingham; Anthony G. Goodfellow, Maghull, both of Great Britain

[73] Assignee: Apsley Metals Limited, United Kingdom

[21] Appl. No.: 339,183

[22] Filed: Apr. 17, 1989

[30] Foreign Application Priority Data

Apr. 23, 1988 [GB] United Kingdom ............. 8809647

[51] Int. Cl.⁵ .................................. B29P 30/08
[52] U.S. Cl. ............................ 156/117; 156/130; 156/130.7; 156/189; 156/405.1
[58] Field of Search .............. 156/405.1, 406.2, 408, 156/397, 425, 117, 130, 130.7, 184, 189

[56] References Cited

U.S. PATENT DOCUMENTS

| | | | |
|---|---|---|---|
| 3,408,244 | 10/1968 | Frazier | 156/408 |
| 3,816,202 | 6/1974 | Stokes | 156/123 |
| 3,923,572 | 12/1975 | Garver | 156/128 |
| 4,398,492 | 8/1983 | Casey | 156/408 |
| 4,465,536 | 8/1984 | Makino et al. | 156/408 |
| 4,555,287 | 11/1985 | Goodfellow | 156/406.2 |
| 4,871,469 | 10/1989 | Perkins | 156/425 |

FOREIGN PATENT DOCUMENTS

| | | | |
|---|---|---|---|
| 8200053 | 8/1983 | Netherlands | 156/406.2 |
| 997253 | 7/1965 | United Kingdom . | |
| 1115731 | 5/1968 | United Kingdom . | |
| 2134439 | 8/1989 | United Kingdom . | |

*Primary Examiner*—Peter Kratz
*Attorney, Agent, or Firm*—Stevens, Davis, Miller & Mosher

[57] ABSTRACT

A method for the manufacture of a tire in which an annular component (11) is placed onto a flexible annular support (12) and the support (12) with component (11) insitu is brought into proximity with a shaped-up tire carcass for assembly of the component to the carcass. The insitu component (11) is assembled to the shaped-up carcass by applying a load through the flexible support (12) to press said component against the carcass. The annular support (12) is locatable on an operating head (34) which includes an applier means (81) which acts on the flexible support causing it to distort and thereby transfer the component (11) to the shaped-up tire carcass.

5 Claims, 5 Drawing Sheets

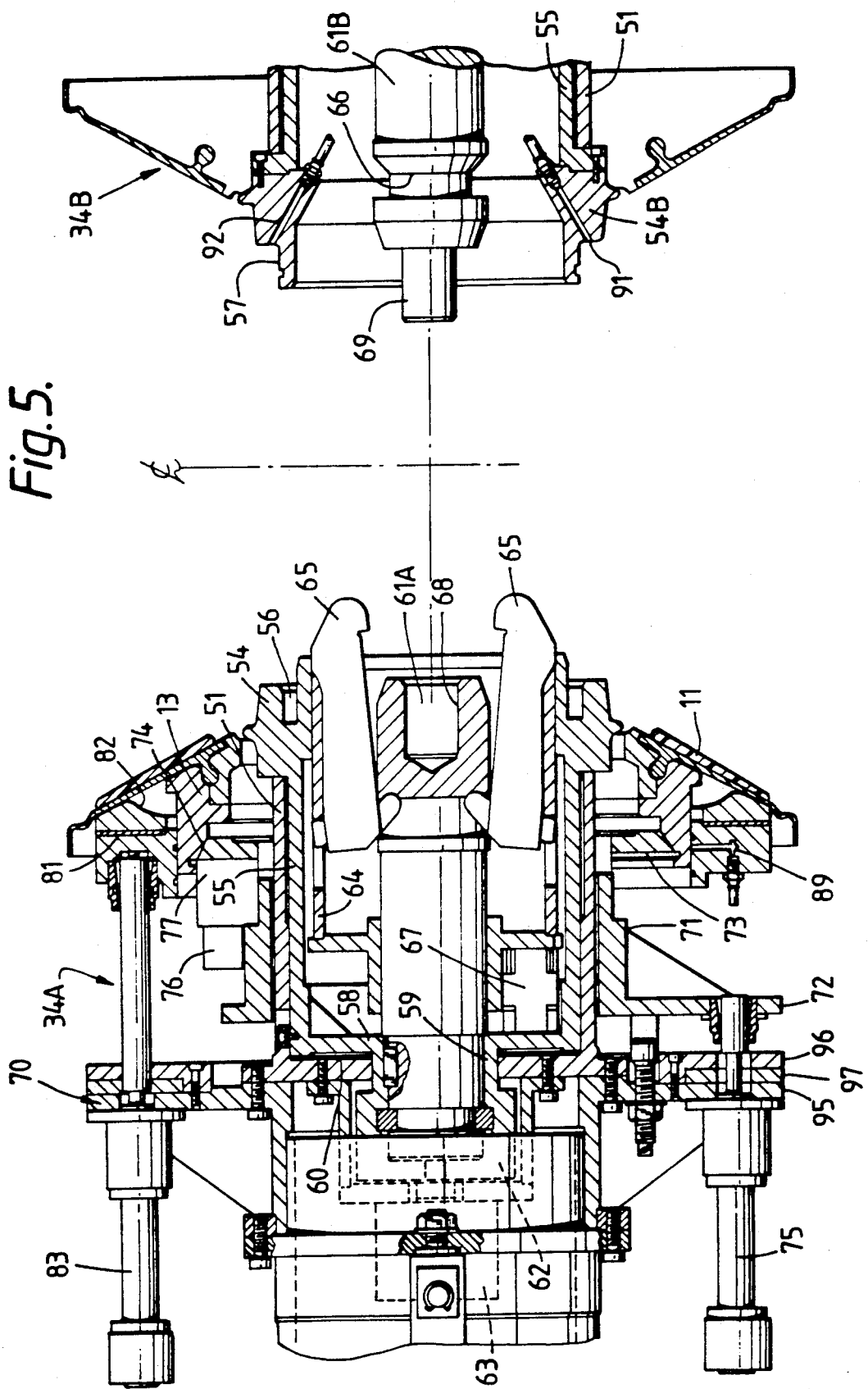

METHOD OF MANUFACTURE OF A TIRE

This invention relates to a method of manufacture of a tire and in particular to a radial carcass pneumatic tire.

Specifically the invention relates to a method of assembling an uncured annular tire component to a torroidal or shaped up tire carcass, and more specifically to a method for assembly of a sidewall to a green tire which is otherwise complete.

In conventional radial tire manufacture the tire carcass is assembled on a flat drum and the sidewall components, apexes, and other components such as chaffers, bead reinforcements, etc., are added in the flat state. The carcass is then shaped up into a torroidal configuration prior to assembly of the breaker belt, tread, and sidewalls. The addition of the sidewalls in particular causes problems since they are typically produced from flat strip which is then wound around the torroidal carcass causing some distortions of the strip which may lead to sidewall blemishes in the finished tire.

Other proposed methods of sidewall assembly include producing an annular uncured sidewall in substantially its final shape in a discrete annular sidewall mould which is brought into contact with a shaped up carcass to fit the premoulded sidewall to the carcass. The sidewall mould then forms part of the tire curing mould. Such a method is proposed in British Patent GB2134439A. However this method has the disadvantage that it is not applicable to conventional tire building methods.

Accordingly there is provided herein a method of manufacture of a tire wherein an annular component is placed onto a flexible support having a first configuration and the flexible support with component insitu is brought into proximity with a torroidal tire carcass so that the annular component is coaxial with and adjacent said carcass, the component then being assembled to the shaped-up carcass by applying a load through the flexible support with the component insitu to press the component against the carcass.

Preferably the flexible support is mounted on a rigid carrier through which the transfer load is applied to the flexible support, and after the transfer of the component to the shaped up carcass the rigid carrier is held clamped in its transfer position holding the component against the carcass, while the carcass is inflated to up to 5 bar to consolidate the carcass and said component.

Conveniently the annular component is placed onto the flexible support at a first location, and the flexible support with component insitu is transferred to a second location for assembly to a tire carcass.

Also according to the invention there is provided an apparatus for the manufacture of a pneumatic tire and which comprises a main frame in which a torroidal tire carcass is locatable, an annular flexible support on which an annular green tire component is locatable, and an operating head on which the flexible support is locatable, the operating head being moveable relative to the frame to place said component in coaxial alignment with the tire carcass, and adjacent the carcass, and applier means on the operating head to press the component insitu on the flexible support against the shaped-up carcass for assembly thereto.

Conveniently the apparatus includes a pair of said operable heads arranged one on each side of said torroidal tire carcass, the two operable heads being coaxial in the operable position and each having means thereon to mutually align said two heads and to lock them together during the transfer of the components to the carcass and during a subsequent consolidation process.

Preferably each operating head is mounted on a body pivotted to the frame, so that the body is in a vertical condition when the operating head receives the annular component, and the body is rotated to a horizontal condition when the annular component is aligned coaxially with the tire for assembly thereto.

It is preferable for the flexible supports to be mounted on a rigid carrier which is separable from the operating head, the carrier supporting the radially inner margin of the flexible support, so that the radially outer portion thereof is displaceable relative to the carrier.

Also according to the invention there is provided a method of manufacture of a tire wherein an annular sidewall component is placed onto an invertable flexible annular support which is brought into proximity with a torroidal tire carcass so that the sidewall component is coaxial with and adjacent the carcass, the sidewall is then assembled to the carcass by inversion of the annular support by progressive distortion thereof from the inner diameter to the outer diameter to transfer the sidewall component from the flexible support to the carcass in a radially outward moving contact to minimize air entrapment.

Also according to the invention there is provided an apparatus for applying an annular sidewall component to a torroidal tire carcass, said apparatus including a flexible invertable support on which an annular sidewall component is locatable, means for locating the invertable support coaxial with and adjacent said carcass, an applier to invert the support to press a sidewall insitu thereon against a torroidal tire carcass for assembling thereto, the applier having a means for progressive assembly of the sidewall to said carcass from its inner diameter to its outer diameter, to minimise air entrapment.

Also according to this invention there is further provided a method of manufacture of a tire wherein an annular sidewall component is placed onto an annular flexible support which is brought into proximity with a torroidal tire carcass so that the sidewall component is adjacent to and coaxial with said carcass, the sidewall component being assembled to the shaped up carcass by applying a load through the flexible support with the component insitu to press the component against the carcass, and after the transfer of the sidewall component to the carcass the flexible support is held against the carcass by a rigid support means, said rigid support means forming part of a containment means around the carcass to support the external surface of the tire when said carcass is inflated.

Also according to this invention there is further provided an apparatus for applying an annular sidewall component to a torroidal tire carcass, said apparatus including a flexible annular support on which an annular sidewall component is locatable, and an applier means to press the flexible support with sidewall component insitu thereon against the shaped-up carcass for assembly of the sidewall component thereto, said applier means being rigid and forming a part of a containment means to support the external surface of the tire when the carcass is inflated.

Also according to this invention there is further provided a method of manufacture of a tire wherein an annular sidewall component is placed onto an annular flexible support which is brought into proximity with a torroidal tire carcass so that the sidewall component is coaxial with and adjacent the carcass, the sidewall is then assembled to the torroidal carcass by distortion of the flexible support with the sidewall component insitu, the flexible support being distorted by a rigid applier means acting through the flexible support to press the sidewall component against the carcass and which has a profiled surface which causes the flexible support to take up a configuration matching the shape of the carcass.

Also according to the invention there is further provided an apparatus for applying an annular sidewall component to a torroidal tire carcass, said apparatus including a flexible annular support on which an annular sidewall component is locatable, and a rigid applier means to act through the flexible support and press an insitu sidewall component against a shaped-up tire carcass, said applier means having a profiled surface thereon which can cause the flexible support to take up a configuration to match the shape of the torroidal carcass.

BRIEF DESCRIPTION OF THE DRAWINGS

The invention will be described by way of example and with reference to the accompanying drawings in which:

FIG. 5 is an enlargement of the operating head illustrated in FIG. 1 showing further detail.

Figure 6:
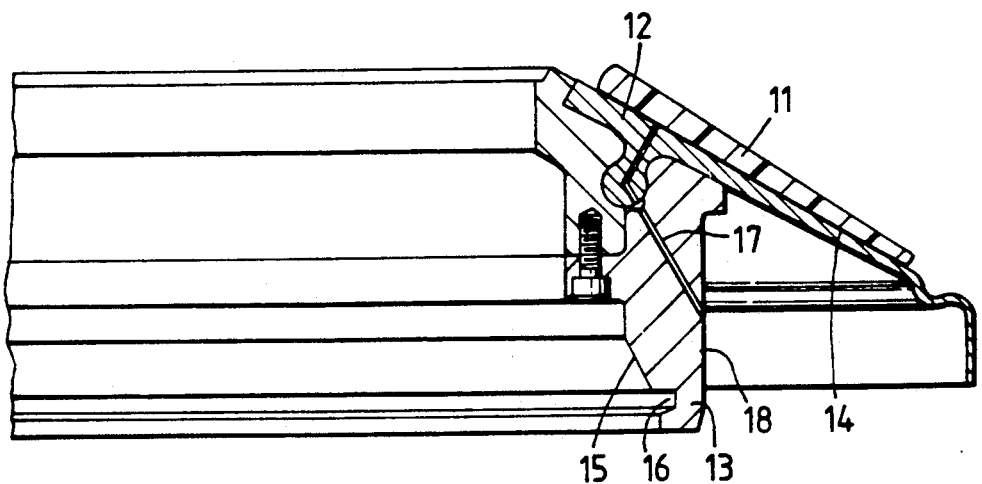
FIG. 6 is a cross-section through a flexible support disc and its transferable carrier.

Now with reference to FIG. 6 of the drawing, an annular component for a tire, preferably an uncured sidewall 11 is produced at an other station which does not form part of this invention, and is supplied to the apparatus of the present invention as a component in substantially its finished shape on a coaxial flexible support 12 fitted to a coaxial transferable carrier 13. The flexible support 12 in its relaxed configuration has a frustoconical outer surface 14 on which the sidewall 11, also in frustoconical form, is located.

It will be seen that the radially inner surface of the carrier has a conical seat 15 thereon and an annular latching groove 16 whose functions will be described later. There is also at least one air passage 17 extending through the flexible support 12 from the conical surface 14 to the radially outer cylindrical surface 18 of the carrier.

Figure 4:
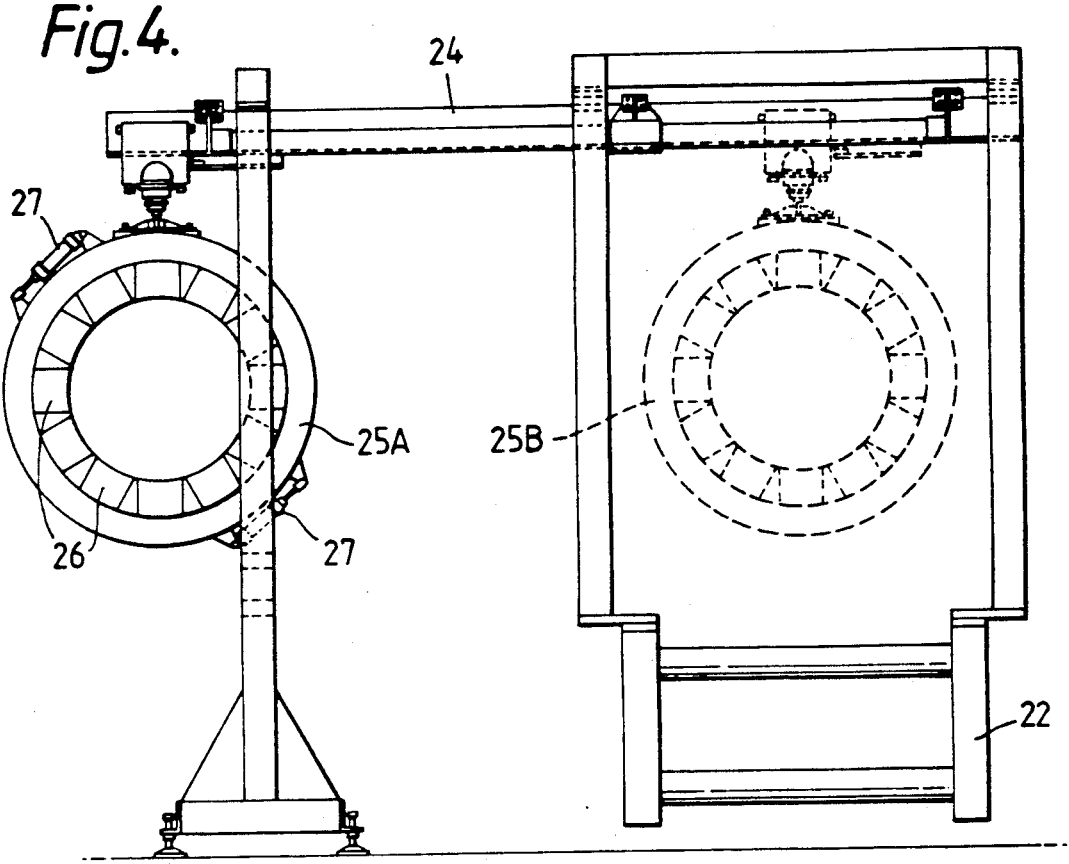
FIG. 4 is section on the line IV—IV of FIG. 1 illustrating the tire carcass transfer mechanism.

A pair of carriers 13 with sidewalls insitu are then transferred to and form a part of a tire building apparatus according to the invention and which will now be described. The apparatus assembles sidewall components to a green tire which is otherwise complete but could be utilized for assembling other annular components to a torroidal tire carcass. The apparatus comprises a frame 21 which is subdivided into a central frame 22, flanked on each side by a pair of side frames 23. The side frames 23 and central frame 22 are in alignment to ensure accurate location of the annular components 11 to a tire carcass. The central frame 22 has a transverse frame 24 (see FIG. 4) mounted thereon which has a tire carcass transfer ring 25 slideably mounted thereon for transverse movement relative to the frame 21 from an external position 25A to an accurately located assembly position 25B within the frame 21 (shown in dotted outline). The transfer ring 25 is a radially expandable and contractable ring which supports a torroidal green tire carcass, preferably except for the sidewalls an otherwise completed tire, and which may comprise a plurality of segments 26 which are expandable by actuators 27. Slideably mounted on the central frame 22 for axial movement there are a pair of centralizing rings 28 which locate a green tire relative to a pair of operating heads 34 on which the sidewalls 11 are carried. (By axial movement is meant movement along the axis of rotation of the tire). The centralizing rings are slideably mounted on tie bars 29 at their upper and lower peripheral portions by brackets 31 so that they can be accurately moved by actuators (not shown). The axially inner surfaces of the two centralizing rings 28 can abut the transfer ring 25 in an operative position so that their radially inner surfaces 30 together with the radially inner surface of the segments 26 match the the required curved surface of the tread of the green tire. The axially outer surfaces of the two centralizing rings are substantially conical and in use will receive the outer peripheral portions of the flexible support when they are turned over in a manner to be described.

The operating heads 34 form a match pair of heads which differ only in the inclusion of male and female locking devices.

Therefore except where specifically stated only one head 34 will be described, the other being identical.

Figure 1:
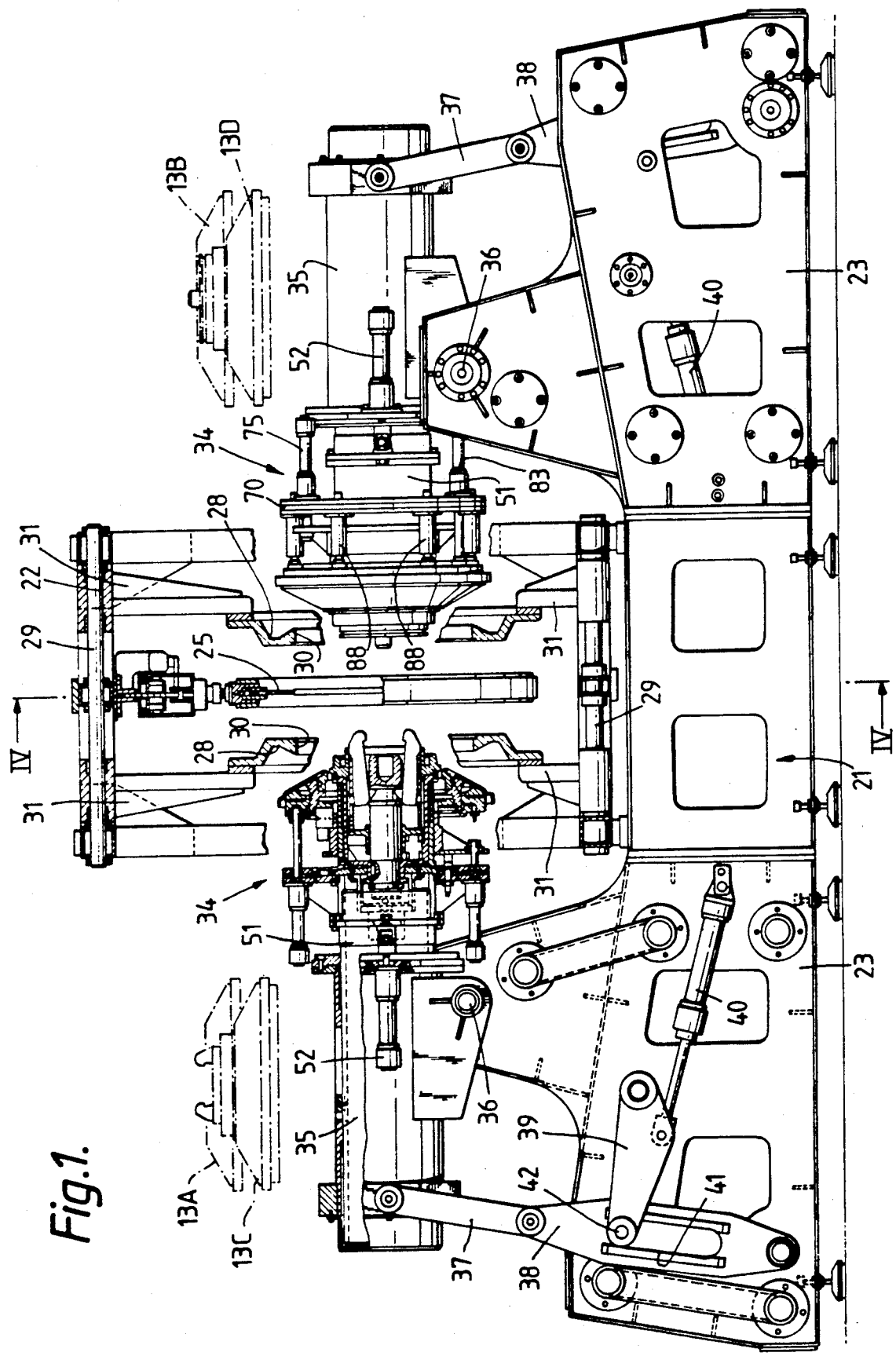
FIG. 1 is a cross-section through a tire building apparatus according to the invention showing the operating heads in their operating positions.
Figure 3:
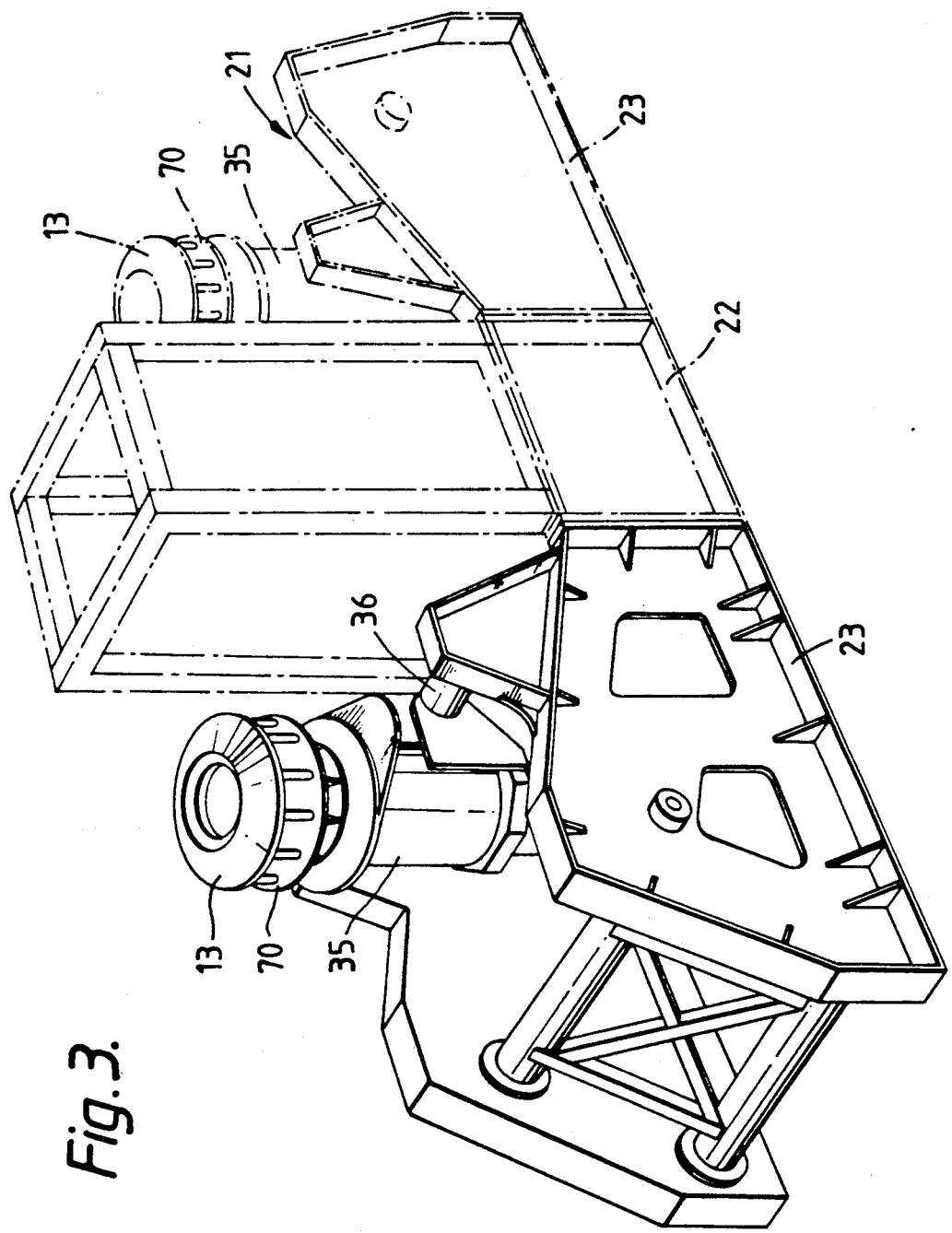
FIG. 3 is a perspective drawing of the apparatus of FIG. 1 showing the operating heads in their loading positions.

Each operating head 34 is carried at one end portion of an elongate body 35 which is piviotted to the respective side frame 23 by a pair of pivot pins 36 located at mid-length position along the body 35. The operating head can be pivotted about the pins 36 between a loading position in which the axis of the head 34 is vertical and an operating position in which the axis of the head 34 is horizontal and coaxial with the axis of a green tire carcass located in the central frame. The other end portion of the body 35 away from the head 34, is connected to a pivoting mechanism 37, 38, 39, 40, for moving the head 34 between the loading and operative positions. The pivoting mechanism comprises a first link 37 pivoted at one end to the body 35 and at its other end to a second link 38. The second link 38 is pivoted at other end to the frame 23 and has a slot 41 therein making a sliding connection with a pin 42 fixed on one end of a third link 39 whose other end is also pivotted to the frame. The third link 39 has an off-center pivottal connection to an actuator 40, preferably a hydraulic actuator. In FIG. 1 the actuator 40 shown in its extended condition with the operating head 34 in its operating position. When the actuator 40 shortens, the third link 39 pivots about the frame anticlockwise moving the pin 42 down the slot 31 in the second link 38 thereby causing the second link to pivot clockwise on the frame. The movement of the second link 38 then causes the first link 37 to pull the attached end portion of the body 35 downwards and thereby pivot the body 35 about the pin 36. As the links 37, 38, 39 collapse together the head 34 is moved into the vertical loading position. This is shown in FIG. 3.

The two operating heads 34 are shown in greater detail in FIG. 5. Each head 34 is mounted on at one end of a main support tube 51 which is telescopically slideable within the respective body 35 so that operation of an actuator 52, preferably an hydraulic actuator, can move the tube 51 axially within the body 35 to place the operating head in its operative position. Each operating head 34 comprises a plurality of tubular members telescopically mounted on the main support tube 51, together with the carrier 13, and an applier member 81 for pressing the component against the green tire through the flexible support 12. A bead seat ring 54 is mounted at one end of a bead ring tube 55 slideable within the main tube 51. The bead seat 54B of the right hand head 34B has two air passageways 91 and 92 therein whereby air pressure can be introduced into a tire carcass located between the two heads 34. The axially inner end faces of the two bead seat rings 54 respectively have an annular recess 56 or annular spigot 57 thereon which sealingly interengage when the two heads 34 are interlocked. The bead ring tube 55 extends axially outwardly to a radially inwardly projecting annular flange 60 of the main tube 51, and has an axially outer end wall 58 with an axially outwardly extending coaxial boss 59 thereon whereby the tube 55 is keyed onto a coaxial central stock 61. The tube 55 has limited axial movement within the main tube 51. The boss 59 at its axially outward end has a cap 62 secured thereon which is operatively connected to an actuator 63, preferably an pneumatic actuator acting between the main tube 51 and the cap 62 to move the bead ring tube 55 within said main tube 51.

Now in the left hand operating head 34A of FIG. 5 there is coaxially and slideably located within the bead ring tube 55, and slideably mounted on the central stock 61, a clamping tube 64 which operates the locking mechanism between the two heads 34. The central stock 61 of the left hand head 34A has a plurality of latch levers 65 pivotted thereto which are engageable in an annular groove 66 in the central stock of the right hand head 34B. The levers 65 are resiliently biased into the unlatched condition and are locked by operating an actuator 67, preferably a pneumatic actuator, acting between the end wall 58 of the tube 55 and the clamping tube 64 to slide the clamping tube rightwards and thereby pivot the ends of the latching levers 65 radially inwardly to engage the groove 66. The left hand central stock 61A has a coaxial bore 68 therein which engages a coaxial spigot 69 on the right hand stock 61B to ensure alignment between the two heads 34A and 34B.

The main tube 51 has a radially outwardly projecting annular flange 70 thereon which is located axially approximate to the inwardly projecting flange 60. On the radially outer surface of the main tube 51 there is slideably mounted a coaxial tubular sidewall carrier sleeve 71 having an outwardly radially projecting flange 72 at its axially outer end and radially outwardly projecting flange 73 at its axially inner end. The axially inner end flange 73 has a radially outer chamfered surface 74 which seats against the like surface 15 on the sidewall carrier 13 to located the separable sidewall carrier 13 on the operating head 34. At least two actuators 75, and preferably three hydraulic actuators, act between the flange 70 on the main tube 51 and the axially outer flange 72 on the carrier sleeve 71 to slide the sleeve 71 to and fro on the main tube 51. The carrier sleeve 71 also have an air actuator 76 thereon adjacent the flange 73. This air actuator 76 operates a locking mechanism 77 which latches in the groove 16 in the carrier 13 to lock the carrier 13 in the operating head 34.

Radially outwardly of the carrier 13 there is located a secondary ring 81 which is slideable on the radially cylindrical outer surface 18 of the carrier 13 and has a profiled axially inner end face 82 which is designed to progressively transfer a sidewall component 11 to a tire carcass. The secondary ring 81 is moved axially relative to the tube 51 by at least two actuators 83, again preferably three hydraulic actuators, that act between the flange 70 and the ring 81. In the circumferential spaces between the actuators 83, there are located on the flange 70 a series of circumferentially spaced guide bushes 88 which extend axially inwardly towards the secondary ring. These are best seen in FIG. 1. These guide bushes each guide a respective support pin secured to the secondary ring 81 to hold the secondary ring in correct alignment with respect to the carrier sleeve 71 when the carrier 13 has been removed. The secondary ring 81 also has air passageways 89 thereon that are connectable with the passageways 17 in the carrier.

These above support pins (not shown) act back onto the flange 70 to support the secondary ring 81 during the consolidation process. The radially outer portion of the flange 70 comprises two axially spaced apart portions 95 and 96 with a rotatable locking plate 97 therebetween. These portions 95, 96, and the plate 97 have aligned holes therein that accommodate the support pins of the secondary ring. When the operating head 34 is fully engaged the respective support pins are drawn out of the flange 70, and the locking plate is then rotated so that the plate blocks off the holes. Thus the support pins then act directly back onto the locking plate 97, and lock the secondary ring 81 in position.

The operation of the tire building apparatus will now be described.

A pair of sidewall carriers 13 are transferred to the tire building apparatus. The two carriers 13 with sidewalls 11 insitu on the flexible support 12 are then loaded onto tire building apparatus of the present invention. Now with reference to FIG. 1, the carriers 13 are located in the positions 13A and 13B shown in dotted outline so that each carrier is coaxial with an operating head 34 of the tire building apparatus which are in their loading positions so that the axes of the heads 34 are substantially vertical. The carriers 13 then slide home to seat on the respective flanges 73 on the carrier sleeves 71 by operation of the actuators 75 to push the the carrier sleeve 71 forward. The respective actuators 76 then operate the locking mechanisms 77 to lock the carriers 13 on their respective carrier sleeves 71 and the sleeve 71 is then withdrawn back to its initial position. The positions of the carriers 13 as fitted in the operating heads 34 are shown in dotted outline 13C, 13D, in FIG. 1, but are more clearly shown in FIG. 3.

Figure 2:
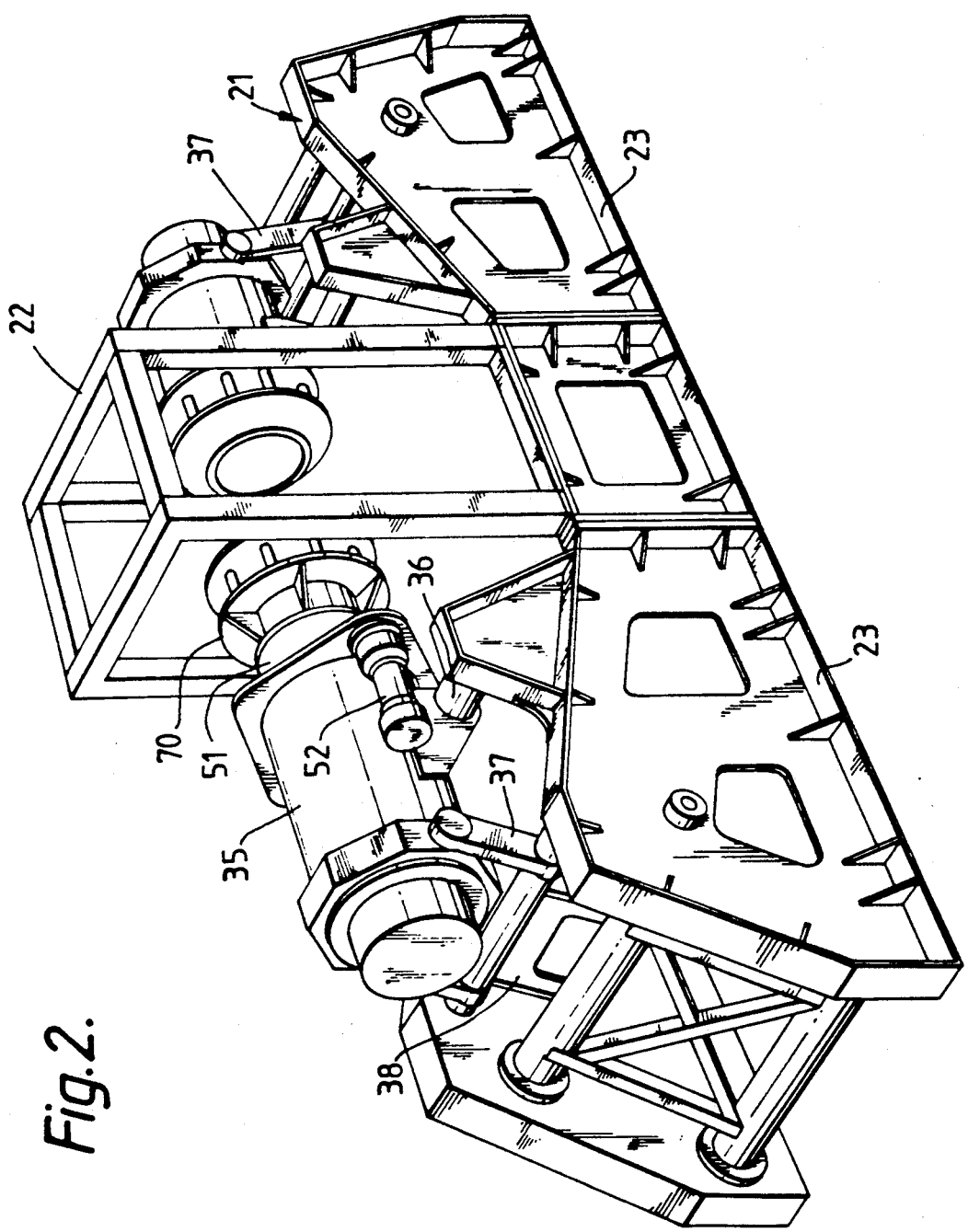
FIG. 2 is a perspective drawing of the apparatus of FIG. 1 also showing the operating heads in their operating positions.

The operating heads 34 are then rotated about the pins 36 by operation of the actuators 40 to take up the positions shown in FIG. 1 and FIG. 2.

A torroidal tire carcass, preferably in the form of a green tire which is lacking only the sidewall components, is fitted into a transfer ring 25 at its external position. The transfer ring 25 is then moved along the transverse frame 24 so that it is located at its assembly position 25B within the central frame 22, so that the tire carcass is located coaxially with the two operating heads 34.

The centralizing rings 28 on the central frame 22 are now operated by an actuator (not shown) to move together and axially locate the transfer ring 25 between the two heads 34. The radially inner surfaces 30 of the two centralizing rings support the outer surface of the tread of said green tire.

The operating heads 34 are now extended axially inwardly by operation of the hydraulic actuator 52 which slides the main tube 51 axially inwardly relative to the body 35, and then operation of the air actuator 63 which slides the bead ring tube 55 axially inwardly relative to the main tube 51 until the bead rings 54 are located within the beads of said green tire carcass. At this point the central stocks 61 of the two heads 34 are interengaged and the locking mechanism comprising the latching levers 65 and the groove 66 is also engaged by operation of the actuator 67 to move the clamping tube 64 axially inwardly so that the levers 65 are clamped in latching arrangement with the groove 66.

The sidewall carriers 13 are then extended axially inwardly to contact the green tire carcass by operation of the actuator 75 which slides the carrier applier axially inwardly and hence the sidewall carrier located thereon so that the green sidewalls 11 contact the radially inner portion of the carcass. An air pressure of about 0.35 bars (5 psi) is introduced into the carcass through one of the air passageways 91, 92, in the right hand bead ring 54B.

The secondary rings 81 are now moved axially inwardly by operation of the actuators 83. The profiled end face 82 is designed to progressively turn the flexible sidewall support 12 axially inwardly so as to progressively transfer the sidewall component 11 from the support to the tire carcass in a radially outwardly moving contact so that air entrappment is reduced to a minimum. The profiled surface 82 has a profile which causes the flexible support 12 to take up a configuration to match the outer sidewall of the tire and may also include the shoulder curve of the green tire. The outer peripheral portion of the flexible supports will almost invert onto the conical axial outer surface of the centralizing rings. At this stage the locking ring 97 is rotated to bring the safety locks into position to support the secondary rings 81. The profiled surface 82, is now positioned to support the respective flexible support 12 against the inflated carcass, this together with the sidewall wall carriers 13, and the centralizing rings 34, and transfer ring 25 forms a containment means which completely surrounds the assembled green tire. The green tire is now fully surrounded by a containment means and a high pressure of up to 5.5 bars [80 psi] is introduced into the carcass to consolidate the carcass against the surrounding heads 34, and centralizing rings.

The air pressure is then released, the operating heads 34 withdrawn by reversal of the cycle and the green tire removed from the machine.

Also the air passageways 17 in the carrier 13 are now in connection with air passageways 89 in the secondary ring so that air can be blown into the carrier surface 14 to release the sidewall if necessary.

We claim:

1. A method of manufacture of a tire comprising placing an uncured elastomeric annular component onto a flexible support which is capable of reversible distortion from a first configuration to a second configuration to match the profile of the outer surface of a shaped-up tire and bringing the flexible support with said component insitu into proximity with a shaped-up tire carcass so that the annular component is coaxial with and adjacent said carcass, then assembling the component to the shaped-up carcass by applying a load through the flexible support with the component insitu and distorting the flexible support under the load to press said component against the carcass, wherein the flexible support in said first configuration has a frustoconical component carrying surface, and distorting the flexible support progressively to said second configuration during the transfer of the component from said carrying surface to a shaped-up tire carcass so that the radially inner portion of the component is initially transferred to the tire, followed by a radially outwardly progressive transfer of the component from the flexible support to the carcass and including mounting the flexible support on a carrier, applying the transfer load to the flexible support by an applier means, wherein after the transfer of the component to the shaped-up carcass, holding the carrier, the applier means and the component against the carcass, and containing the carcass while inflating the carcass to a pressure of up to 5 bar to consolidate the carcass and said component.

2. A method as claimed in claim 1, which is for the assembly of an uncured sidewall component to a radial carcass green tire including carcass ply, beads, a breaker, and tread, including the steps of transferring the tire to an accurately located assembly position in transfer means and holding the tire in said position for assembly of the sidewall component from the flexible support to the tire, and then removing the assembled tire from the assembly position while being carried in the same transfer means.

3. A method as claimed in claim 1, including placing the annular component onto the flexible support at a first location, and transferring the flexible support with the component insitu to a second location for assembly to a tire carcass.

4. A method as claimed in claim 3 including placing the annular component onto the flexible support at the first location while holding the support in a substantially horizontal mode and transferring the flexible support in the horizontal mode to the second location and then reorienting the flexible support to a substantially vertical mode to coaxially align with the tire carcass.

5. A method as claimed in claim 1, wherein the applier means has an applier surface thereon profiled to distort the flexible support to a shape to match the shape of the carcass.

* * * * *